S. C. COX.
FEEDER FOR ADDRESSING MACHINES.
APPLICATION FILED MAY 29, 1905.
1,073,741.
Patented Sept. 23, 1913.
5 SHEETS—SHEET 1.
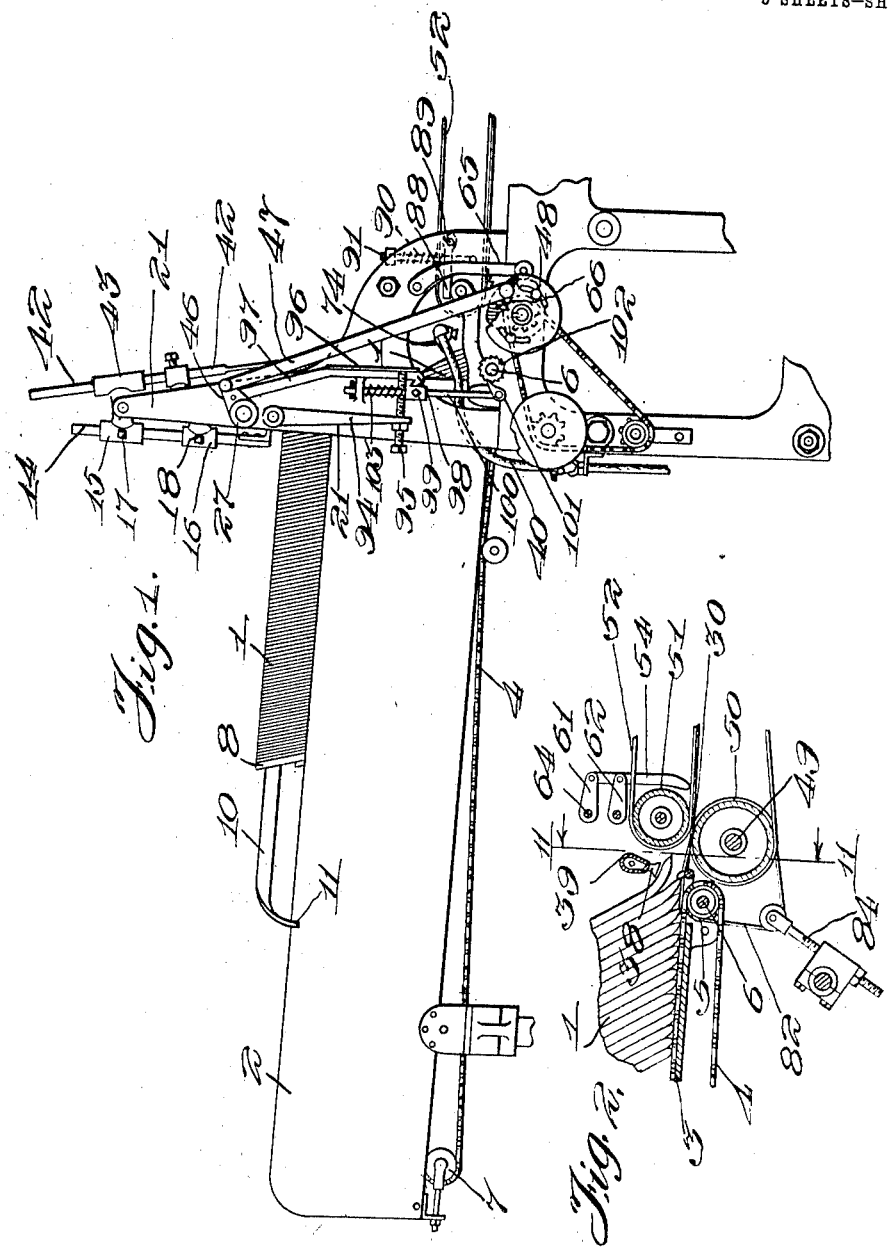
Witnesses:
Inventor:
S. C. Cox
by Francis A. Hopkins
Atty

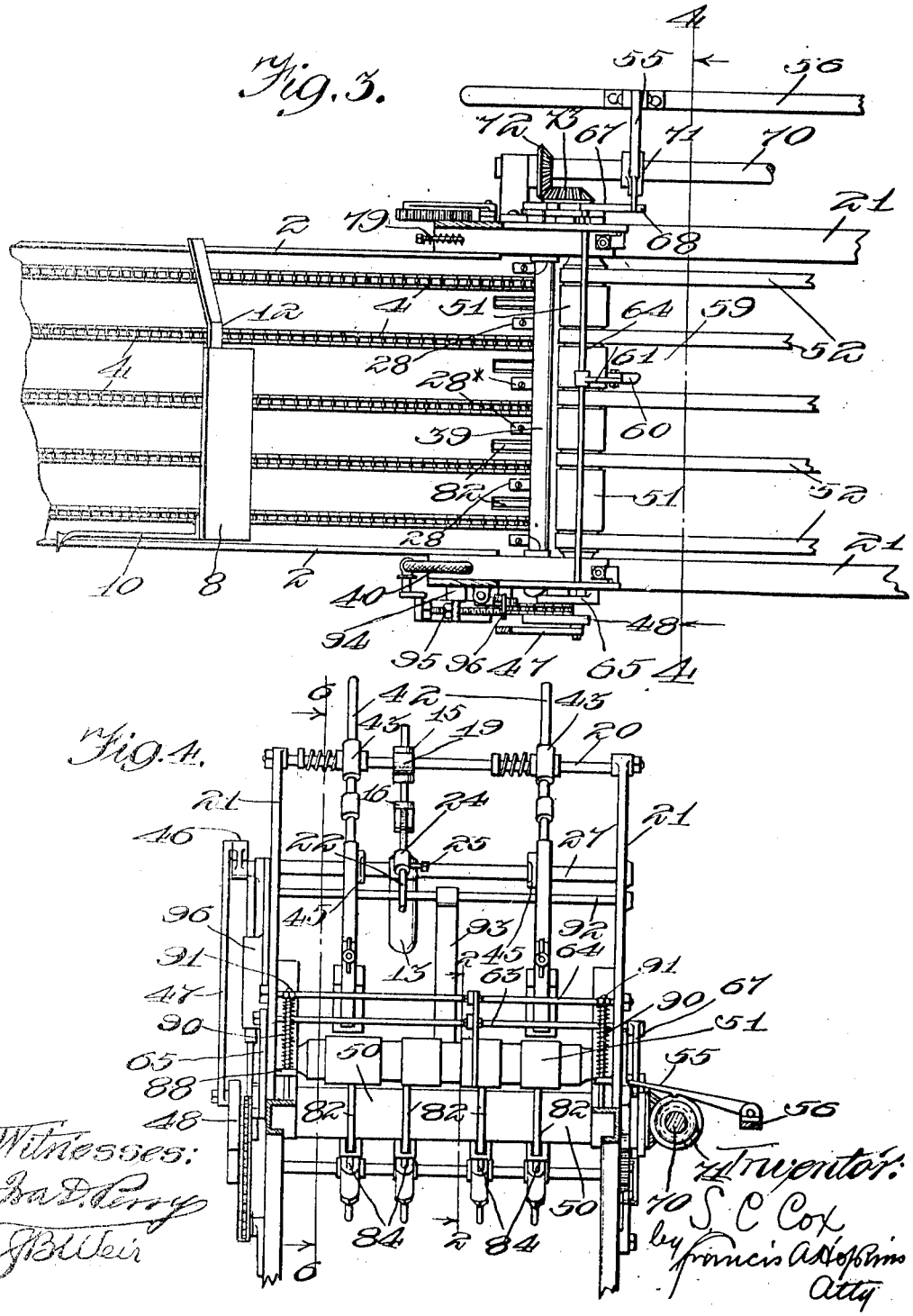

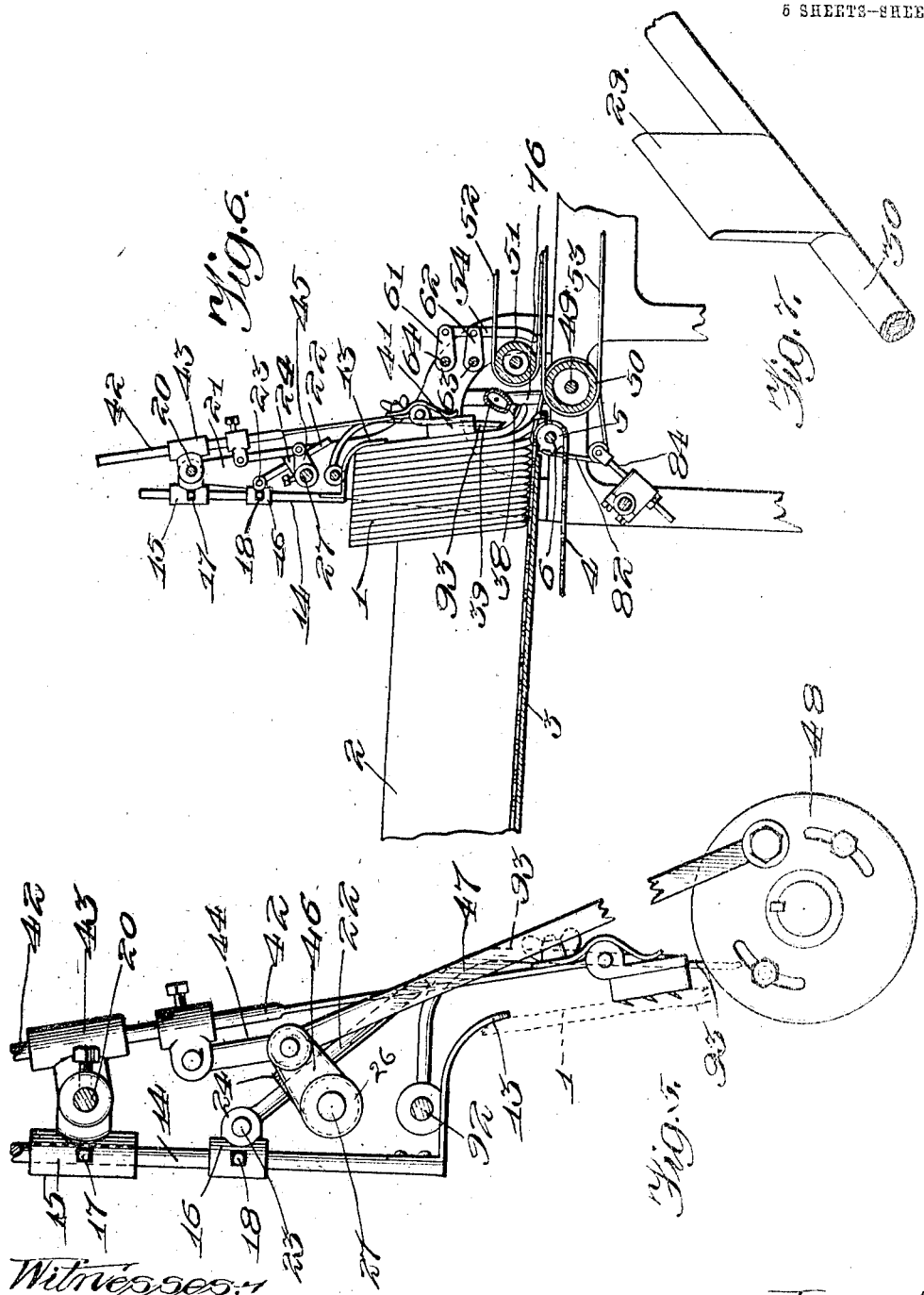

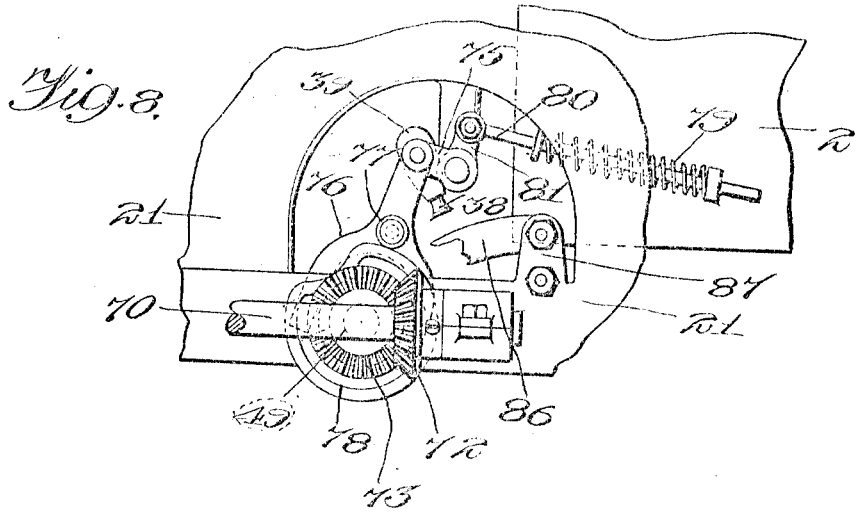

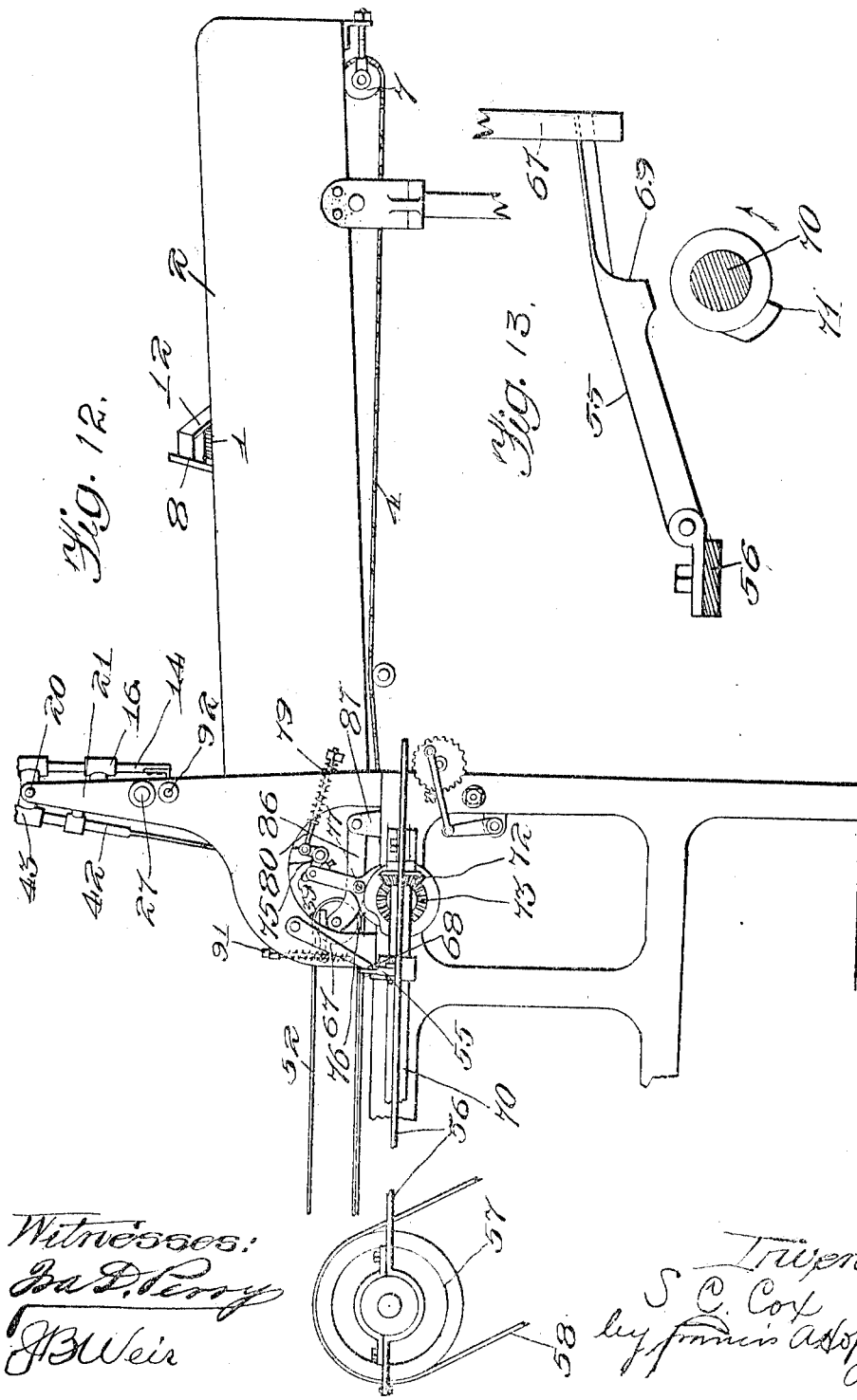

UNITED STATES PATENT OFFICE.

SANDFORD C. COX, OF CHICAGO, ILLINOIS, ASSIGNOR, BY MESNE ASSIGNMENTS, TO COX MULTI-MAILER COMPANY, OF AUGUSTA, MAINE, A CORPORATION OF MAINE.

FEEDER FOR ADDRESSING-MACHINES.

1,073,741.     Specification of Letters Patent.     Patented Sept. 23, 1913.

Application filed May 29, 1905. Serial No. 262,722.

*To all whom it may concern:*

Be it known that I, SANDFORD C. COX, a citizen of the United States, residing at Chicago, in the county of Cook and State of Illinois, have invented certain new and useful Improvements in Feeders for Addressing-Machines, of which the following is a full, clear, and exact specification.

My invention is designed as an improvement upon the addressing machine and feeding mechanism embodied therein, shown in Patent No. 1,033,232, issued to me July 23, 1912, which describes a machine especially adapted for addressing newspapers and other like articles, in which the papers to be addressed are placed in a horizontal or substantially horizontal trough or hopper and are fed one at a time to suitable mechanism for imprinting the address thereon.

My present invention has reference to the means for feeding the papers along said hopper and removing them one at a time therefrom preparatory to being addressed, and to means for stopping the machine in the event the feeding mechanism should fail to act in a proper manner; and the invention has for its object to provide improved and efficient means for accomplishing these ends.

The invention consists in the features of novelty which will now be described with reference to the accompanying drawings and more particularly pointed out in the claims.

In the said drawings—Figure 1 is a side elevation of a portion of an addressing machine provided with my feeding mechanism. Fig. 2 is a detail vertical, longitudinal section on the line 2, 2, Fig. 4. Fig. 3 is a plan view. Fig. 4 is a vertical cross section on the line 4, 4 Fig. 3. Fig. 5 is an enlarged detail view of certain parts in side elevation hereinafter described. Fig. 6 is a vertical, longitudinal section on the line 6, 6, Fig. 4. Fig. 7 is an enlarged detail perspective view of the gate hereinafter described. Fig. 8 is a detail side elevation of the means for actuating the sucker bar. Fig. 9 is a side elevation of the mechanism for actuating the gate, showing connected parts. Fig. 10 is an enlarged vertical cross section on the line 10, 10, Fig. 11, and Fig. 11 is a detail vertical section on the line 11, 11 Fig. 2. Fig. 12 is a side elevation similar to Fig. 1, of the opposite side of the machine. Fig. 13 is an enlarged detail view of the trip dog and cam.

The papers or other articles to be addressed are indicated at 1 and these are placed on edge with their folded edges downward in a hopper or feed trough 2 provided in the bottom 3 thereof with a number of traveling chains or belts 4 running over sprockets 5 on a shaft 6 at their forward ends and over idlers 7 at their rear ends and upon which chains the edges of the papers impinge so that the entire supply is fed forward as a whole. At the end of the supply within the hopper or trough is placed a follower board 8, which is preferably arranged in an inclined position and is provided with hooks 9 or other suitable devices at its lower edge whereby it may be hitched to the chains 4 and carried along therewith. The upper edge of the board 8 at one end is supported upon the edge of the hopper 2 by an arm 10, which is provided at its end with a prong 11 fitting over the edge of the hopper and thereby holding the board from rotating on its upright axis, while the other end of the board is provided with an arm 12 extending over and resting on the opposite side or edge of the hopper. As shown in Fig. 3 the board is considerably narrower than the width of the hopper and is arranged at one side of the hopper, leaving quite a space at the other side of the hopper so that the doubled ends of the papers which are arranged at this side will not be unduly squeezed or compressed, it being understood that the supply is thicker or longer on that side than on the other side and consequently requires more room, and for the same reason the arm 12 is bent backwardly so that it affords the requisite support to the follower board and prevents the pile or supply from being unduly loose while avoiding undue compression.

The forward end of the supply of papers is supported and the papers held in an upright position by one or more stop arms 13, curving upwardly and backwardly over the upper edges of the papers and secured to the lower end of a stem 14, which is mounted in two collars 15, 16 adjustably secured to the stem 14 by set screws 17, 18. The collar 15 is formed or secured on a collar 19, which is journaled on a cross rod 20 mounted in projections 21 on the side frames, and the collar 16 is supported on the upper end of a rod 22 which is pivoted at 23 to the collar 16 and passes downwardly through a collar 24 to which it is adjustably attached by set screw 25. The collar 24 is formed on or secured to a collar 26 mounted upon a cross shaft 27, which is also secured in the projections 21, the shaft being capable of rocking in the collar 26 without rotating the latter and serving as a support for the rod 22. The stop 13 being curved downwardly in the manner described it serves to engage the upper edges of the papers as they approach it and to not only limit their forward movement but to press them downwardly against the bottom of the hopper in case that they should by any possibility ride upwardly before reaching the stop 13. The purpose of the various adjustable collars, the stem 14 and rod 22 is to provide for the vertical and lateral adjustment of the stop 13, it being evident that the perpendicular adjustment may be effected by simply sliding the stem 14 upwardly in the collars 15, 16 while the latter adjustment may be produced by sliding the rod 22 in its clamping collar 24.

The forward end of the supply of papers at their lower edges is held back or retarded by a shoulder 28 produced across the bottom 3 of the hopper in any suitable way, as better shown in Fig. 10, and arranged a slight distance beyond this shoulder is a gate or shutter 29 similar to that described in my aforesaid application, but which in my present invention is comparatively short instead of extending substantially across the bottom of the hopper, and serves to engage the lower edge of the foremost paper and hold the same in place, the greater part of the strain produced by the forward movement of the entire supply of papers being borne by the shoulder 28, which relieves the shutter or gate 29 of severe pressure and also prevents the ends of the papers at the sides of the shutter or gate from being pushed forwardly beyond the gate as would be the case if the pressure of the main supply were not retarded by some such device as the shoulder 28 before the pressure reached the papers immediately in the rear of shutter 29. This shutter or gate 29 is mounted upon a rocker shaft 30 which is provided with a crank arm 31 connected to an operating rod 32, see Fig. 9. One end of this rod is formed with a yoke 33 surrounding a shaft 34 on which is secured a cam 35 adapted to act upon pin 36 on said yoke at each revolution of the shaft and cause the shutter or gate 29 to open or move outwardly, allowing the paper to pass, the opposite movement of the shutter being produced by any suitable spring 37 or other means, as described in my aforesaid patent. Just as the shutter or gate 29 thus opens, the lower edge of the paper is picked up or lifted clear of the shutter or gate by a number of suckers 38 mounted upon the under side of a sucker bar or tube 39 connected by pipe 40 with any suitable pump or other suction device for exhausting the air, and as the sucker thus lifts the paper, the gate 29 is again returned as shown in Fig. 6 to catch the next paper and hold it in place. The suckers then release the foremost paper, which is forced downwardly by needle blocks 41 mounted upon arms 42 which slide in collars 43 pivoted on the rod 20 and which arms are connected by links 44 to crank arms 45 on the rocker shaft 27. The rocker shaft is provided with a crank 46 connected by pitman 47 with a crank 48 on shaft 49. As the paper is thus forced downwardly by the needle blocks it is caught between feed rollers 50, 51 and tapes 52, 53 and conducted away to the addressing mechanism or other place not necessary to be described, the character of the treatment which it receives after leaving the mechanism which constitutes the subject of the present invention, being entirely immaterial so far as the claims of this application are concerned. Inasmuch, however, as the papers are ordinarily addressed in addressing machines for which this feeding mechanism is especially adapted, from slugs or linotypes and the machine is necessarily so timed that one of such slugs or other devices, carrying the address to be printed, comes into position to be printed at each operation of the machine, that is to say each time the suckers 38 lift one of the papers, or makes its stroke whether it lifts the paper or not, it naturally follows that such slug would pass by or pass out of printing position without leaving its imprint on some one of the papers should anything happen to prevent the paper from reaching the printing position in due order of time with relation to the operation of the balance of the mechanism. In order therefore that the machine may be stopped automatically should anything occur to prevent one of the papers from being introduced between the feed rolls 50, 51 each time the sucker bar 39 makes a complete stroke, the automatic stop or throw out mechanism, which will now be described, is employed. This consists primarily of a finger 54 which is adapted to rest upon the paper while the same is passing under it between the tapes 52, 53 and is thereby supported, and operatively related to this finger is a trip dog 55, which is secured to a lever 56 that serves to throw the machine in and out of operation, one end of the lever being attached in any suitable way to one member 57 of any suitable clutch whereby the machine is driven, 58 representing a part of the driving belt. Arranged under the finger 54 is a plate 59

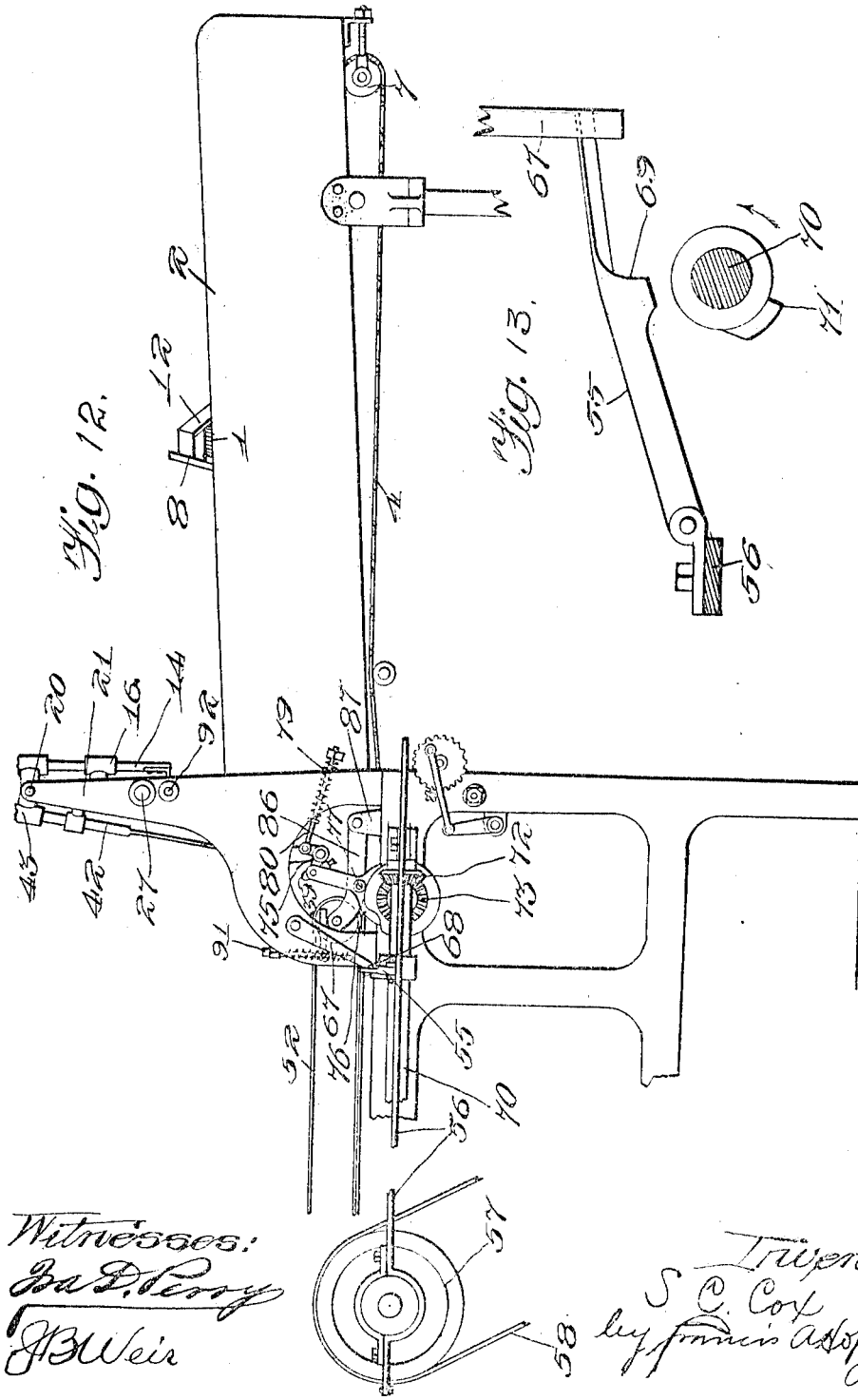

present invention the lower end of the gage 93 is arranged as close to the upper end of the gate or shutter 29 as possible because at this point the compression of the papers remains uniform and as a consequence the gage does not act to throw the hook bar 96 out of operation until the foremost paper reaches a predetermined point or comes firmly against the back of the shutter or gate 29.

The means for addressing the papers after they leave the trigger or finger 54 of the stop mechanism, or even while passing said finger or trigger, may be of any suitable form, such for example as that shown and described in my aforesaid application, and operatively connected in any suitable way with the trigger or finger 54 as would be the case if it were connected with and operated by the clutch 57, and such a connection as that may be understood for the purpose of this application.

Having thus described my invention what I claim as new therein and desire to secure by Letters Patent, is:

1. In a device for the purpose described, the combination of means for holding a supply of papers, means for extracting the papers from said supply, means for driving or actuating said extracting means, a gravity stop for throwing the extracting means out of action, the end of said stop being arranged to be supported and held inactive by the extracted paper and while the paper is moving, and mechanical means operable as the paper passes away from the stop for supporting said stop to prevent the latter from throwing the last said means out of operation when the papers are being properly fed.

2. In a device for the purpose described, the combination of means for holding a supply of papers, means for extracting the papers from said supply, mechanism for receiving and acting upon the papers after they leave the extracting means, stop mechanism including a gravity actuated member for throwing the first said mechanism out of action, said stop being supported and held inactive by the paper and while the paper is moving, a cam, and means operatively related to the said gravity member and influenced by the cam for supporting the gravity member as the paper passes away from the stop for also preventing said mechanism from being thrown out of action.

3. In a device for the purpose described the combination of means for holding a supply of papers, mechanism for receiving and acting upon the papers, means for extracting the papers from the supply and introducing them to the said mechanism, means operatively connecting the extracting means in time with the said mechanism, a stop mechanism embodying a gravity controlled member set in the line of movement of the paper after leaving the supply for rendering the first said mechanism inactive should a paper fail to pass the stop mechanism in time with the operation of the first said mechanism, said stop being supported by the paper while the paper is moving and means other than the papers and operable as the papers pass away from the stop for supporting the said gravity controlled member for preventing the stop mechanism from throwing the first said mechanism out of action, said means comprising an arm operatively related to the stop mechanism, and a cam coöperating with the arm.

4. In a device for the purpose described the combination of means for holding a supply of papers, mechanism for receiving and acting upon the papers after they are extracted from the supply, a stop mechanism comprising a gravity controlled trigger arranged in the line of movement of the papers from the supply, means operatively connected with the said stop mechanism whereby the first said mechanism is rendered inactive should a paper fail to pass the trigger in time with the operation of the first said mechanism, and means other than the papers and operable as the paper passes away from the stop for retaining the mechanism in operation when the papers are being uniformly fed, said trigger being supported by the paper while the paper is moving, said means comprising an arm for supporting the trigger to hold the latter inactive operatively related to the trigger and a cam coöperating with the arm.

5. In a machine for the purpose described the combination of a hopper for holding a supply of papers on edge, means in said hopper for feeding the papers forward, a shoulder in the bottom of the hopper near the forward end thereof on which the edges of the papers impinge for holding back the main supply, a gate or shutter situated a short distance beyond said shoulder for restraining the papers situated between the shoulder and gate, means for opening said gate periodically, means operatively connected with the gate for lifting the lower edge of the foremost paper clear of the gate when the gate opens, and means for conducting away the paper thus extracted.

6. In a machine for the purpose described the combination with a hopper for holding a supply of papers, means in the bottom of the hopper for feeding the papers forward, a shoulder near the forward end of the hopper for engaging the edges of the papers and restraining their advance movement, a supplemental feeding band arranged in the bottom of the hopper beyond said shoulder for feeding the papers forward, and means for extracting the papers one at a time from the forward end of the supply.

7. In a device for the purpose described the combination of a hopper for holding a supply of papers, feed belts in the bottom of the hopper upon which the papers rest, a follower board attached at its lower edge to said feed belts and being shorter than the width of the hopper and arranged to one side of the center of the hopper, an arm projecting rearwardly from the follower board and engaging one of the side walls of the hopper and a rearwardly deflected arm at the other end of the follower, supported loosely upon the hopper.

8. In a device for the purpose described the combination of a hopper for holding a supply of papers on edge, means for advancing the papers in the hopper, means at the bottom of the hopper for holding the papers in check at their lower edges, and a stop having an extended body arranged over the hopper and adapted to be engaged by the upper edges of the papers and a downwardly and rearwardly extending extremity adapted to be engaged by the front side of the foremost paper.

9. In a machine for the purpose described the combination of a hopper for holding a supply of papers on edge, means at the bottom of the hopper in one end for restraining the papers at their lower edges, a stop having an extended body arranged above the hopper for engaging the upper edges of the papers and a downwardly and rearwardly curved extremity adapted to engage the front face of the foremost paper, and means whereby said stop may be adjusted vertically and laterally.

10. In a machine for the purpose described the combination of a hopper for holding a supply of papers on edge, means for advancing the papers in the hopper, means for operating said advancing means comprising a throw-out for rendering the advancing means inactive, a gage operatively connected with said throw-out and arranged to be impinged by the papers near their lower edges and shifted thereby, and means for engaging the foremost paper at its lower edge and contiguous to said gage, for restraining the forward movement of the papers.

11. In a device for the purpose described, the combination of means for holding a supply of papers, means for conducting the papers away from said supply, means for extracting the papers one at a time preparatory to being removed by said conducting means, an apertured support over which the papers pass after leaving said extracting means, a stop mechanism embodying a gravity actuated trigger arranged over the aperture of said support and adapted to rest upon the moving paper for normally holding the stop mechanism inactive without interrupting the movement of the paper, means operatively connecting said stop mechanism with said extracting means, whereby the latter will be rendered inactive should a paper fail to pass said trigger in time with the operation of the extracting means, and rotary cam mechanism supporting the trigger during the intervals between successive papers when the papers are normally fed and also operable to permit the extracting means to remain active during said intervals.

12. In a device of the class described, the combination of means for holding a supply of papers, means for extracting the papers from said supply, means for driving or actuating the extracting means, a rock shaft, a gravity stop operatively related to the shaft for throwing the extracting means out of action, said stop being adapted to be acted upon and held inactive by the paper extracted and while the paper is moving, an arm operatively related to the shaft, and a cam adapted to engage the arm only as the paper passes away from the stop to support and prevent the stop from throwing the extracting means out of operation.

13. In a device for the purpose described, the combination of means for holding a supply of papers, means for extracting the papers from the said supply, mechanism for receiving and acting upon the papers after they are extracted from the supply, a stop mechanism including a gravity controlled trigger arranged in the line of movement of the papers from the supply, means operatively connected with said stop mechanism whereby the second recited means is held active by the paper extracted and while the paper is moved, and is rendered inactive should the paper fail to pass the trigger in time with the operation of the first said mechanism, a member operatively connected with the stop for also retaining the extracting means in operation when the papers are being uniformly fed and a cam coöperating with the said member and adapted to operate the latter as the papers pass away from the stop for controlling the stop.

14. In a device of the class described the combination of means for holding a supply of papers, means for extracting the papers from said supply, means for actuating the extracting means including coöperative elements, a shifting arm operatively related to one of the operating elements for moving the same into an inoperative position, a stop mechanism held inactive by the extracted paper, means operatively related to the stop mechanism for holding the shifting arm in an inoperative position, said means being adapted to release the arm when the stop mechanism is actuated, and means operatively related to one of the other operating elements for shifting the arm when released.

15. In a device of the class described the the collar 16 is supported on the upper end of a rod 22 which is pivoted at 23 to the collar 16 and passes downwardly through a collar 24 to which it is adjustably attached by set screw 25. The collar 24 is formed on or secured to a collar 26 mounted upon a cross shaft 27, which is also secured in the projections 21, the shaft being capable of rocking in the collar 26 without rotating the latter and serving as a support for the rod 22. The stop 13 being curved downwardly in the manner described it serves to engage the upper edges of the papers as they approach it and to not only limit their forward movement but to press them downwardly against the bottom of the hopper in case that they should by any possibility ride upwardly before reaching the stop 13. The purpose of the various adjustable collars, the stem 14 and rod 22 is to provide for the vertical and lateral adjustment of the stop 13, it being evident that the perpendicular adjustment may be effected by simply sliding the stem 14 upwardly in the collars 15, 16 while the latter adjustment may be produced by sliding the rod 22 in its clamping collar 24.

The forward end of the supply of papers at their lower edges is held back or retarded by a shoulder 28 produced across the bottom 3 of the hopper in any suitable way, as better shown in Fig. 10, and arranged a slight distance beyond this shoulder is a gate or shutter 29 similar to that described in my aforesaid application, but which in my present invention is comparatively short instead of extending substantially across the bottom of the hopper, and serves to engage the lower edge of the foremost paper and hold the same in place, the greater part of the strain produced by the forward movement of the entire supply of papers being borne by the shoulder 28, which relieves the shutter or gate 29 of severe pressure and also prevents the ends of the papers at the sides of the shutter or gate from being pushed forwardly beyond the gate as would be the case if the pressure of the main supply were not retarded by some such device as the shoulder 28 before the pressure reached the papers immediately in the rear of shutter 29. This shutter or gate 29 is mounted upon a rocker shaft 30 which is provided with a crank arm 31 connected to an operating rod 32, see Fig. 9. One end of this rod is formed with a yoke 33 surrounding a shaft 34 on which is secured a cam 35 adapted to act upon pin 36 on said yoke at each revolution of the shaft and cause the shutter or gate 29 to open or move outwardly, allowing the paper to pass, the opposite movement of the shutter being produced by any suitable spring 37 or other means, as described in my aforesaid patent. Just as the shutter or gate 29 thus opens, the lower edge of the paper is picked up or lifted clear of the shutter or gate by a number of suckers 38 mounted upon the under side of a sucker bar or tube 39 connected by pipe 40 with any suitable pump or other suction device for exhausting the air, and as the sucker thus lifts the paper, the gate 29 is again returned as shown in Fig. 6 to catch the next paper and hold it in place. The suckers then release the foremost paper, which is forced downwardly by needle blocks 41 mounted upon arms 42 which slide in collars 43 pivoted on the rod 20 and which arms are connected by links 44 to crank arms 45 on the rocker shaft 27. The rocker shaft is provided with a crank 46 connected by pitman 47 with a crank 48 on shaft 49. As the paper is thus forced downwardly by the needle blocks it is caught between feed rollers 50, 51 and tapes 52, 53 and conducted away to the addressing mechanism or other place not necessary to be described, the character of the treatment which it receives after leaving the mechanism which constitutes the subject of the present invention, being entirely immaterial so far as the claims of this application are concerned. Inasmuch, however, as the papers are ordinarily addressed in addressing machines for which this feeding mechanism is especially adapted, from slugs or linotypes and the machine is necessarily so timed that one of such slugs or other devices, carrying the address to be printed, comes into position to be printed at each operation of the machine, that is to say each time the suckers 38 lift one of the papers, or makes its stroke whether it lifts the paper or not, it naturally follows that such slug would pass by or pass out of printing position without leaving its imprint on some one of the papers should anything happen to prevent the paper from reaching the printing position in due order of time with relation to the operation of the balance of the mechanism. In order therefore that the machine may be stopped automatically should anything occur to prevent one of the papers from being introduced between the feed rolls 50, 51 each time the sucker bar 39 makes a complete stroke, the automatic stop or throw out mechanism, which will now be described, is employed. This consists primarily of a finger 54 which is adapted to rest upon the paper while the same is passing under it between the tapes 52, 53 and is thereby supported, and operatively related to this finger is a trip dog 55, which is secured to a lever 56 that serves to throw the machine in and out of operation, one end of the lever being attached in any suitable way to one member 57 of any suitable clutch whereby the machine is driven, 58 representing a part of the driving belt. Arranged under the finger 54 is a plate 59